United States Patent
Zhang et al.

(10) Patent No.: US 10,156,241 B2
(45) Date of Patent: Dec. 18, 2018

(54) CONTROLLING A WET COMPRESSION SYSTEM

(71) Applicant: General Electric Company, Schenectady, NY (US)

(72) Inventors: Hua Zhang, Greer, SC (US); Valery Ivanovich Ponyavin, Greenville, SC (US); Weilun Yu, Greenville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 89 days.

(21) Appl. No.: 15/583,073

(22) Filed: May 1, 2017

(65) Prior Publication Data

US 2018/0313357 A1  Nov. 1, 2018

(51) Int. Cl.
| | |
|---|---|
| G05D 7/06 | (2006.01) |
| F04D 27/00 | (2006.01) |
| F04D 29/58 | (2006.01) |
| G05D 16/20 | (2006.01) |

(52) U.S. Cl.
CPC ....... F04D 27/006 (2013.01); F04D 29/5846 (2013.01); G05D 7/0635 (2013.01); G05D 16/2013 (2013.01)

(58) Field of Classification Search
CPC . F04D 27/006; F04D 29/5846; G05D 7/0635; G05D 16/2013

USPC ........................................................ 700/282
See application file for complete search history.

(56) References Cited

U.S. PATENT DOCUMENTS

| | | | |
|---|---|---|---|
| 2010/0242490 A1 | 9/2010 | Symonds | |
| 2018/0001334 A1* | 1/2018 | Erdmann | ................ A23C 1/04 |

* cited by examiner

*Primary Examiner* — Robert E Fennema
*Assistant Examiner* — Marzia T Monty
(74) *Attorney, Agent, or Firm* — Ernest G. Cusick; Hoffman Warnick LLC

(57) ABSTRACT

Embodiments of the present disclosure include methods, systems and program products for controlling a wet compression system. Methods according to the present disclosure can include: calculating a water droplet size at a nozzle of a nozzle grid of the WCS based on at least one condition from a set of WCS operating fluid conditions; calculating at least one GT system performance parameter based on the water droplet size and at least one distinct condition from the set of WCS operating fluid conditions; determining a target water flow rate based on the at least one GT system performance parameter and another distinct condition from the set of WCS operating fluid conditions; and adjusting a flow rate of a water flow to the nozzle based on the target water flow rate.

20 Claims, 5 Drawing Sheets

CONTROLLING A WET COMPRESSION SYSTEM

BACKGROUND

The disclosure relates generally to control systems and methods for a wet compression system. More specifically, the present disclosure relates to controlling the water flow rate of a wet compression system to the operation of a gas turbine system.

Gas turbine (GT) systems generally incorporate wet compression systems to cool the air entering a compressor of the GT system to reduce the amount of work required to compress the air. Wet compression systems conventionally include a grid of nozzles for introducing droplets of water to the air before the fluid enters the compressor. Degradation and erosion of nozzles in the wet compression system may cause a reduction in pressure across the nozzles, which may enlarge the droplet size of the water entering the compressor. The enlarged water droplets may accelerate erosion of the blades in the compressor and/or impede some features of the wet compression system. Blade erosion and decreased wet compression system performance may negatively affect the power output of the GT system.

Controlling the water flow rate of the wet compression system can mitigate nozzle degradation and erosion. Conventional solutions to control water flow rate can include monitoring pressure across a nozzle of the wet compression system. For example, conventional wet compression systems may incorporate a controller to reduce the flow rate of water of the system based on whether the pressure across the nozzles drops below a set pressure threshold value.

SUMMARY

A first aspect of the disclosure provides a method for operating a wet compression system (WCS) for a gas turbine (GT) system including: calculating a water droplet size at a nozzle of a nozzle grid of the WCS based on at least one condition from a set of WCS operating fluid conditions; calculating at least one GT system performance parameter based on the water droplet size and at least one distinct condition from the set of WCS operating fluid conditions; determining a target water flow rate based on the at least one GT system performance parameter and another distinct condition from the set of WCS operating fluid conditions; and adjusting a flow rate of a water flow to the nozzle based on the target water flow rate.

A second aspect of the disclosure provides a system for operating a wet compression system (WCS) for a gas turbine (GT) system, the system including: a controller in communication with the WCS, the controller being operable to: calculate a water droplet size at a nozzle of a nozzle grid of the WCS based on at least one condition from a set of WCS fluid operating conditions; calculate at least one GT system performance parameter based on the water droplet size and at least one distinct condition from the set of WCS operating fluid conditions; determine a target water flow rate based on the at least one GT system performance parameter and another distinct condition from the set of WCS operating fluid conditions; and adjust a flow rate of a water flow to the nozzle based on the target water flow rate.

A third aspect of the invention provides a program product stored on a computer readable storage medium for operating a wet compression system (WCS) in a gas turbine (GT) system, the computer readable storage medium including program code for causing a computer system to: calculate a water droplet size at a nozzle of a nozzle grid of the WCS based on at least one condition from a set of WCS operating fluid conditions; calculate at least one GT system performance parameter based on the water droplet size and at least one distinct condition from the set of WCS operating fluid conditions; determine a target water flow rate based on the at least one GT system performance parameter and another distinct WCS operating fluid condition from the set of WCS operating fluid conditions; and adjust a water flow rate to the nozzle based on the target water flow rate.

BRIEF DESCRIPTION OF THE DRAWINGS

These and other features of the disclosed system will be more readily understood from the following detailed description of the various aspects of the system taken in conjunction with the accompanying drawings that depict various embodiments, in which.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION

Figure 1:
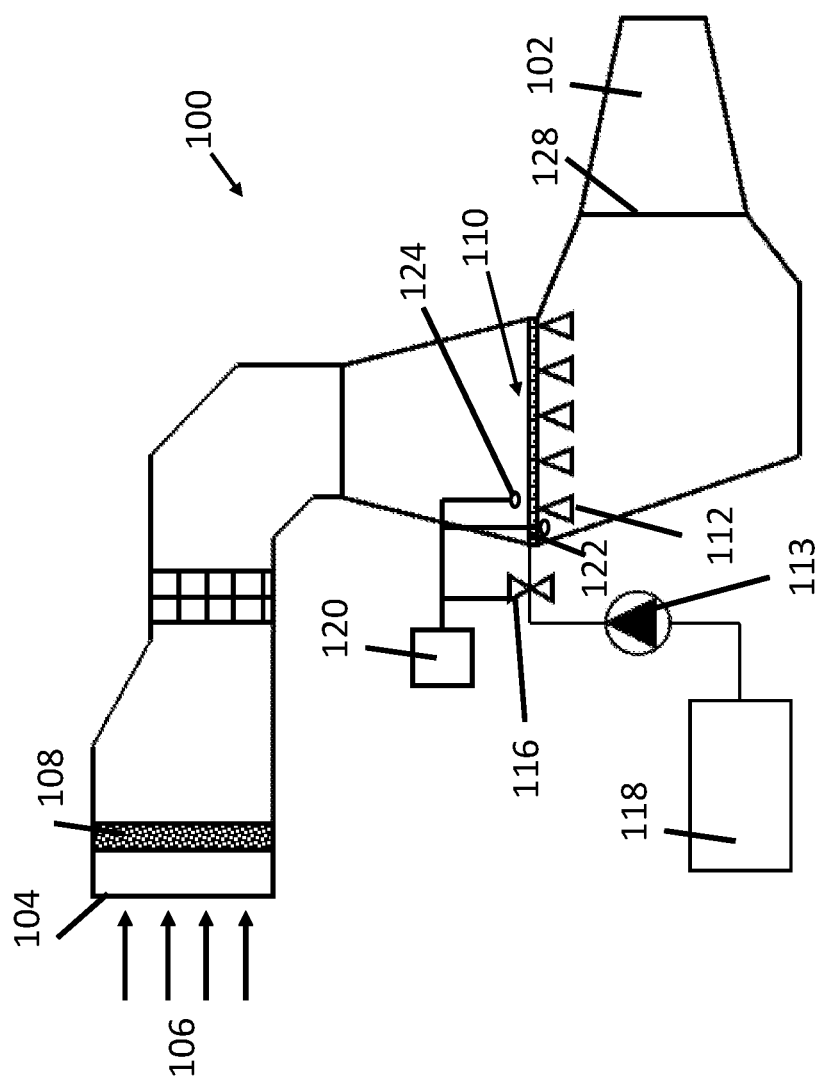
FIG. 1 is a schematic view of a conventional wet compression system for a gas turbine system.

In the following description, reference is made to the accompanying drawings that form a part thereof, and in which is shown by way of illustration specific embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

Embodiments of the present disclosure provide for the active control of a wet compression system (hereinafter, "WCS") including controlling a water flow rate to improve power output and reduce maintenance costs in a gas turbine (GT) system. Processes according to the disclosure can include applying an analysis program of a WCS to calculate a target water flow rate for reducing degradation and erosion of nozzles, and improving power output of the GT system. Further processes can include periodically and/or continuously monitoring the WCS and adjusting the water flow rate based on the target water flow rate, rather than reducing the flow rate based on a set pressure threshold. Embodiments of the present disclosure may also apply an analysis program of the WCS to calculate the attributes of degradation of nozzles of the WCS, which can then be used to determine a predicted replacement time for the nozzles.

The term "model," as used herein, can include any equation, look-up table, system of equations, neural network, artificial intelligence, matrix, algorithm, and/or mathematical model which relates one or more sets of inputs to various operating parameters, performance parameters, and operating conditions of the WCS and/or GT system, including conditions of a fluid path through the systems. Each "model" may, for example, incorporate a weighting system based on the importance of each variable within the model and/or the type of system. In an example, the weighting system may include model weights for each variable of the model based on the type of GT system. The term "operating fluid conditions," as used herein, generally refers to physical properties (e.g., temperature, pressure, flow rate) of the operating fluids within the components of the WCS and/or GT system. The term "operating parameter" as used herein generally refers to a quantifiable value relating operating fluid conditions to an operating condition of the system. The term "performance parameter" as used herein generally refers to a quantifiable value relating operating fluid conditions to the performance of the system. The models may predict one or more quantities representing another operating fluid condition and/or system performance and/or system parameters, and these predicted quantities may be used to determine a target water flow rate and/or nozzle replacement time to improve the power output and reduce the maintenance costs of the GT system.

FIG. 1 shows a conventional WCS 100 in fluid communication with a compressor 102 of a GT system and a pump 118. WCS 100 includes an inlet 104 through which air 106 enters the WCS. Air 106 may flow through a filter 108. Air 106 continues to flow through the WCS towards a nozzle grid 110 including, for example, one or more nozzles 112. Nozzle grid 110 may be in fluid communication with pump 118, for example, at connection 130 to supply a water flow 113 to the nozzle grid of the WCS. Valve 116 between pump 118 and nozzle grid 110 controls the flow rate of water flow 113 to the WCS. Nozzle(s) 112 of nozzle grid 110 can introduce water droplets (not shown) to air 106 traveling through WCS 100. Air 106, including the water droplets, may travel downstream to exit WCS 100 at outlet 128 and enter compressor 102. WCS 100 may be used to cool air 106 before entering compressor 102 to reduce the amount of work required by compressor 102 to condense the air.

Conventional WCSs such as WCS 100 may include a controller 120 to monitor a pressure drop across the nozzles of nozzle grid 110. For example, controller 120 may monitor a pressure drop including a pre-injection water pressure and post-injection water pressure across nozzle 112 using pressure sensors 122, 124. Controller 120 adjusts the flow rate of water flow 113 entering WCS 100 by adjusting valve 116 based on whether the pressure drop across the nozzle (e.g., nozzle 112) drops below a set threshold value.

Figure 2:
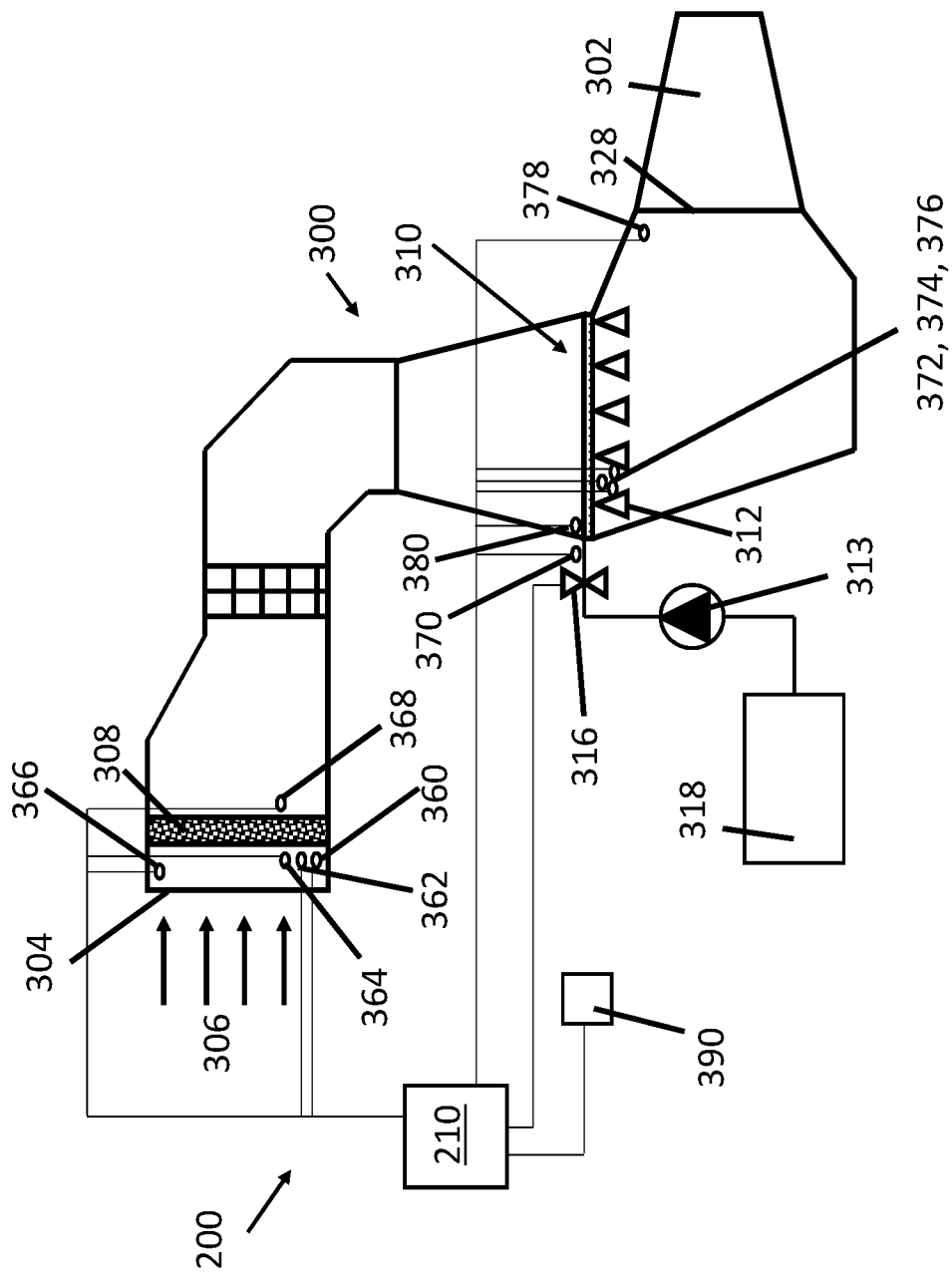
FIG. 2 is a schematic view of a system for controlling a wet compression system according to embodiments of the present disclosure.

Turning to FIG. 2, a system 200 for controlling a WCS 300 (e.g., WCS 100 of FIG. 1) according to embodiments of the present disclosure is shown. System 200 can include and/or interact with WCS 300, for example, to periodically adjust a water flow rate to the WCS based on a calculated target flow rate and/or calculated nozzle replacement time. System 200 therefore may also improve the output power and reduce the maintenance costs of the GT system, e.g., by offering additional control over the water flow rate to the WCS.

During operation, operating fluids may flow through WCS 300 and/or compressor 302. An "operating fluid" may include any fluid transmitted to and used within WCS 300 and/or compressor 302 and/or pump 318 and/or any other component of a GT system during operation. For example, an operating fluid in the form of air 306 for compressor 102 may, for example, enter WCS 300 at inlet 304, travel through filter 308 and nozzle grid 310, and exit the WCS through outlet 328 to enter compressor 102. Additionally, in another example, a water flow 113 may, for example, travel from a pump (e.g., pump 318) through valve 316 to the nozzle(s) of nozzle grid 310 for injection into air 306 before exiting through outlet 328 of the WCS to enter compressor 102.

A "condition" of operating fluids (e.g., air 306, water flow 313, etc.) within WCS 300 and/or compressor 302, and/or pump 318 as described herein, generally refers to any single quantifiable property or group of quantifiable properties pertaining to the operating fluids. As examples, conditions can include without limitation, a temperature (expressed, e.g., in degrees Celsius (° C.), and/or a pressure (expressed, e.g., in Pascals (Pa)). Other types of conditions may include, for example, electric conductivity, fluid velocity, kinetic energy, mass flow rate, volumetric flow rate, volumetric flux, fluid density, fluid momentum, viscosity, and dimensionless properties derived from one or more other conditions.

To control the operation of WCS 300, embodiments of system 200 may include, for example, a controller 210 coupled to various sensors, valves, etc., of WCS 300 and/or compressor 302, and/or pump 318 to determine and control various aspects of WCS 300 as discussed herein. Controller 210 can generally include any type of computing device capable of performing operations by way of a processing component (e.g., a microprocessor) and as examples can include a computer, computer processor, electric and/or digital circuit, and/or a similar component used for computing and processing electrical inputs. Example components and operative functions of controller 210 are discussed in detail elsewhere herein.

One or more sensors can be in communication with controller 210 and may be positioned, for example, within corresponding areas of WCS 300, and/or compressor 302 and/or pump 318 and/or any other location where conditions of operating fluids can be measured or examined Examples of locations, without limitation, may include: inlet 304 and/or outlet 328 of WCS 300, upstream and/or downstream of nozzle grid 310 within WCS 300, upstream and/or downstream of filter 308 within WCS 300, connection 330 between pump 318 and nozzle grid 310, etc. As shown in FIG. 2, sensors may include, for example, sensors 360, 362, 364, 366, 368, 370, 372, 374, 376, 378, 380. Each sensor 360, 362, 364, 366, 368, 370, 372, 374, 376, 378, 380 can be configured to determine (e.g., by direct measurement and/or calculation from related variables) various quantities such as the conditions of the operating fluids (e.g., the temperature and/or pressure of air 306 entering inlet 304 of WCS 300), etc., to determine additional conditions of the operating fluid(s), and/or GT system performance parameters, and/or WCS operating parameters, etc. For example, the sensors can be configured to determine various operating fluid conditions to determine water droplet size of the water leaving the nozzles of nozzle grid 310. Sensor(s) 360, 362, 364, 366, 368, 370, 372, 374, 376, 378, 380 may be in direct and/or indirect communication with controller 210 by any now known or later developed techniques. For example, sensors 360, 362, 364, 366, 368, 370, 372, 374, 376, 378, 380 may use a server (not shown) to communicate with controller 210. In another example, sensors 360, 362, 364, 366, 368, 370, 372, 374, 376, 378, 380 may be in direct communication with controller 210 by a direct connection (not labeled).

A variety of sensors can be used in embodiments of the present disclosure. Sensor(s) 360, 362, 364, 366, 368, 370, 372, 374, 376, 378, 380 can be in the form of temperature sensor(s), pressure sensor(s), and/or other devices for evaluating the properties of the operating fluids at a particular location. For example, sensors 360, 362, 378 may include a temperature sensor. Sensors in the form of a temperature sensor can include thermometers, thermocouples (i.e., voltage devices indicating changes in temperature from changes in voltage), resistive temperature-sensing devices (i.e., devices for evaluating temperature from changes in electrical resistance), infrared sensors, expansion-based sensors (i.e., sensors for deriving changes in temperature from the expansion or contraction of a material such as a metal), and/or state-change sensors. Where one or more sensors include temperature sensors, the temperature of fluid(s) passing through the location of the sensor(s) can be measured and/or converted into an electrical signal or input relayed to controller 210. In another example, sensor(s) 360, 362, 364, 366, 368, 370, 372, 374, 376, 378, 380 may include pressure sensors. Sensors in the form of pressure sensors can include barometers, manometers, tactile pressure sensors, optical pressure sensors, ionizing pressure sensors, etc. In another example, sensor(s) 360, 362, 364, 366, 368, 370, 372, 374, 376, 378, 380 may include volumetric flow rate sensors. Sensors in the form of volumetric flow rate sensors can include venture meters, optical flow meters, positive displacement meter, etc. In another example, sensor(s) 360, 362, 364, 366, 368, 370, 372, 374, 376, 378, 380 may include electric conductivity sensors. Sensors in the form of electric conductivity sensors can include electrical conductivity (EC) meter, etc.

Sensor(s) 360, 362, 364, 366, 368, 370, 372, 374, 376, 378, 380 may also derive one or more conditions from other measured quantities, e.g., temperature, pressure, flow rate, etc. These measured quantities, in turn, can be measured at multiple positions of WCS 300 and/or compressor 302 and/or pump 318 and applied to mathematical equations for other conditions of the operating fluids, e.g., via controller 210. In this case, sensor(s) 360, 362, 364, 366, 368, 370, 372, 374, 376, 378, 380 can include components for measuring variables related to temperature and/or pressure or other metrics, and processing components (e.g., computer software) for prediction and/or calculating values of temperature and/or pressure or other metrics based on the related variables. In general, the term "calculating" in the context of sensor(s) 360, 362, 364, 366, 368, 370, 372, 374, 376, 378, 380 refers to the process of mathematically computing a particular value by direct measurement, predictive modeling, derivation from related quantities, and/or other mathematical techniques for measuring and/or finding a particular quantity. In any event, the conditions measured by each sensor(s) 360, 362, 364, 366, 368, 370, 372, 374, 376, 378, 380 can be indexed, tabulated, etc., according to a corresponding time of measurement. As is discussed elsewhere herein, controller 210 can act as a "pseudo-sensor" for calculating (e.g., by estimation or derivation) one or more other conditions of operating fluids at positions within WCS 300 and/or compressor 302 and/or pump 318 which do not include sensor(s) 360, 362, 364, 366, 368, 370, 372, 374, 376, 378, 380.

System 200 may also include one or more interfaces in communication with controller 210 and positioned, e.g., within corresponding areas of WCS 300 and/or system 200 and/or any other desirable location for entering and receiving input and/or displaying output to the interface. As shown in FIG. 2, interface 390 may be in communication with controller 210. Each interface, e.g., interface 390, can be configured to determine and/or analyze and/or receive and/or display various inputs and/or outputs based on the condition of operating fluids of WCS 300 and/or components of the WCS. For example, interface 390 may be configured to determine and/or analyze replacement time for nozzles of the wet compression nozzle grid 310 of WCS 300 and/or display the replacement time for the nozzles. In another example, interface 390 may be configured to analyze component types, for example, the type of nozzle 312 in nozzle grid 310. Interface 390 may include any now known or later developed device for determining and/or analyzing inputs, and/or any now known or later developed device for determining and/or displaying outputs. Interface 390 may be in direct and/or indirect communication with controller 210 by any now known or later developed techniques for allowing an interface to be in communication with a controller. For example, interface 390 may utilize a server to communicate with controller 210. In another example, interface 390 may be in direct communication with controller 210 by a direct connection (not labeled).

WCS 300 and/or compressor 302 and/or pump 318 and/or system 200 can include one or more control valves positioned to adjust various aspects of WCS 300 and/or pump 318 during operation. For example, valve 316 may be positioned between pump 318 and connection 330 to nozzle grid 310 of WCS 300 to adjust the flow rate of water flow 313 to nozzle grid 310. Although control valve 316 is shown by example of being positioned proximal to connection 330 between pump 318 and nozzle grid 310, control valve 316 and any other desirable number of control valves may be positioned in other portions of WCS 300 and/or pump 318. For example, control valves may be positions in any desirable location to affect the flow rate of operating fluids entering or leaving WCS 300.

Regardless of which control valve (e.g., control valve 316) is manipulated, one or more variables such as the amount, temperature, flow rate, etc., of operating fluids within WCS 300 can be affected by adjusting the position of the control valve(s) as described herein. For example, as shown in FIG. 2, control valve 316 may control an amount or fraction of water flow 313 entering nozzle grid 310 of WCS 300, and more specifically can govern the rate at which water is introduced to air 306 from a preceding component. Although one control valve is shown in FIG. 2 of WCS 300, it is understood that any desirable number of control valves may be positioned in any desirable location to control operating fluids entering and/or leaving WCS 300.

As discussed herein, controller 210 may be operably coupled to a component of WCS 300 to adjust a flow rate of water entering WCS 300. For example, controller 210 may be operably coupled to control valve 316 to govern the position of the control valve during operation of WCS 300. Controller 210, more specifically, can adjust a flow rate of operating fluid entering the WCS (e.g., by adjusting a position of control valve 316) based on conditions of operating fluids (e.g., air 306, etc.) detected and/or determined by sensor(s) 360, 362, 364, 366, 368, 370, 372, 374, 376, 378, 380 and/or interface 390.

Controller 210 may include, for example, program code installed by a user which includes mathematical equation(s) and/or models for relating one or more conditions of operating fluids of WCS 300 to performance parameters of the GT system and/or operating parameters of the WCS and/or water flow rate(s) entering the WCS. The mathematical equation(s) and/or models may e.g., mathematically and/or analytically determine a target water flow rate and periodically adjust the flow rate of water flow 313 to WCS 300. Adjusting the flow rate of water flow 313 to WCS 300 with controller 210 can, e.g., reduce maintenance costs and improve power output of the GT system. Controller 210 may also include, for example, program code installed by a user which includes mathematical equation(s) and/or models for relating one or more conditions of operating fluids of WCS 300 to a replacement time of the nozzles of nozzle grid 310 in order maintain and/or replace the nozzles to reduce maintenance costs and improve power output of the GT system.

Figure 3:
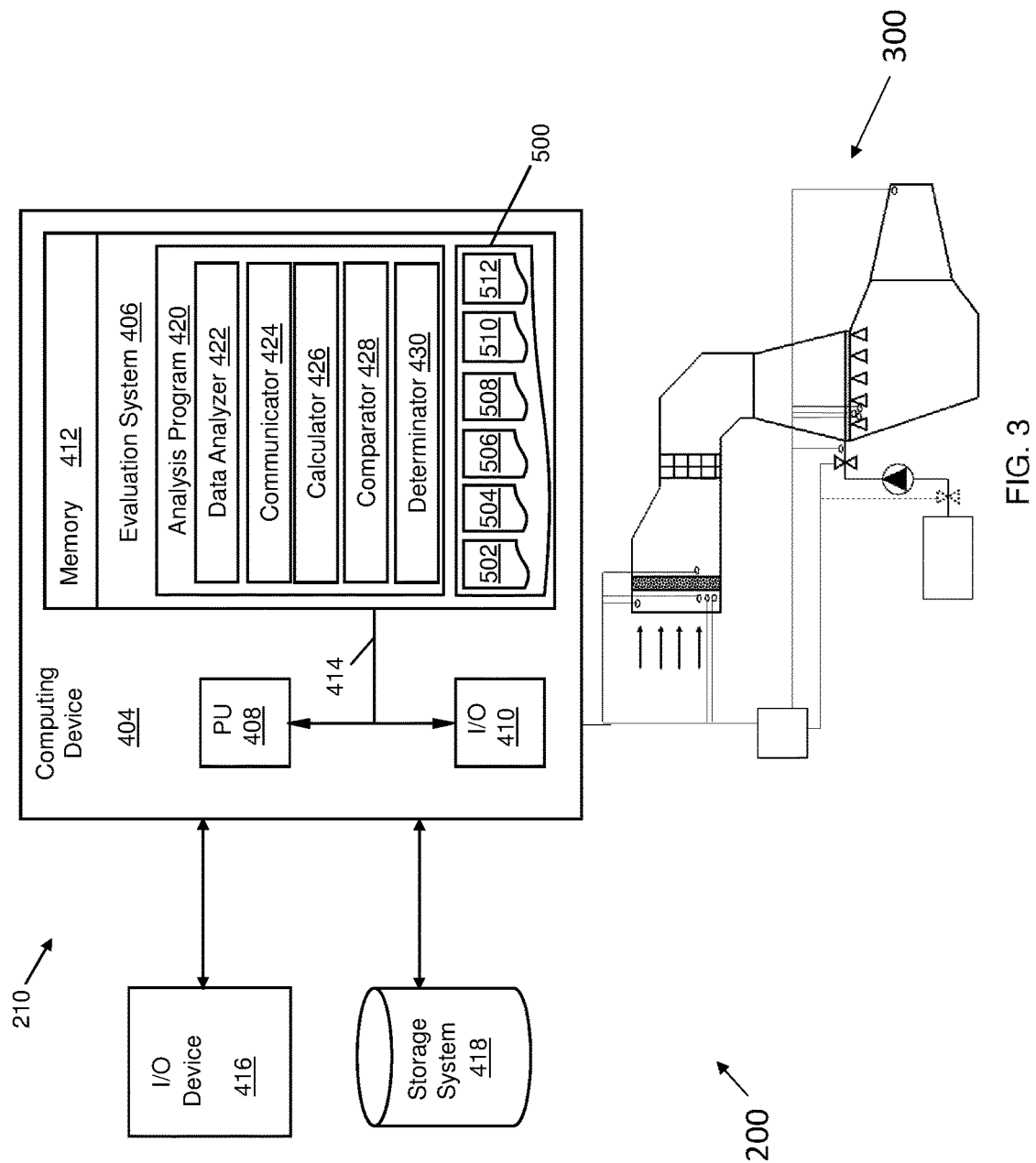
FIG. 3 shows an example computer environment operable to control a wet compression system, according to embodiments of the present disclosure.

Referring to FIGS. 2 and 3 together, an example embodiment of controller 210 and sub-components thereof is illustrated with a simplified depiction of system 200. In particular, controller 210 can include a computing device 404, which in turn can include an evaluation system 406. The components shown in FIG. 3 are one embodiment of system 200 for controlling WCS 300. As discussed herein, computing device 404 can provide mathematical equation(s) and/or models which relate operating fluid conditions and/or GT system performance parameters and/or WCS operating parameter and/or WCS component conditions to each other. Furthermore, embodiments of the present disclosure may, for example, adjust a flow rate of water flow 313 to WCS 300 based on a target water flow rate to improve power output and reduce maintenance costs of the GT system based on, e.g., measurements obtained with sensor(s) 360, 362, 364, 366, 368, 370, 372, 374, 376, 378, 380 and/or interface 390. Embodiments of the present disclosure may be configured or operated in part by a technician, computing device 404, and/or a combination of a technician and computing device 404. It is understood that some of the various components shown in FIG. 3 can be implemented independently, combined, and/or stored in memory for one or more separate computing devices that are included in computing device 404. Further, it is understood that some of the components and/or functionality may not be implemented, or additional schemas and/or functionality may be included as part of evaluation system 406.

Computing device 404 can include a processor unit (PU) 408, an input/output (I/O) interface 410, a memory 412, and a bus 414. Further, computing device 404 is shown in communication with an external I/O device 416 and a storage system 418. Evaluation system 406 can execute an analysis program 420, which in turn can include, various software components configured to perform different actions, including, for example, a data analyzer 422, a communicator 424, a calculator 426, comparator 428 and, a determinator 430. The various modules of evaluation system 406 can use algorithm-based calculations, look up tables, and similar tools stored in memory 412 for processing, analyzing, and operating on data to perform their respective functions. In general, PU 408 can execute computer program code to run software, such as evaluation system 406, which can be stored in memory 412 and/or storage system 418. While executing computer program code, PU 408 can read and/or write data to or from memory 412, storage system 418, and/or I/O interface 410. Bus 414 can provide a communications link between each of the components in computing device 404. I/O device 416 can comprise any device that enables a user to interact with computing device 404 or any device that enables computing device 404 to communicate with the equipment described herein and/or other computing devices. I/O device 416 (including but not limited to keyboards, displays, pointing devices, etc.) can be coupled to controller 210 either directly or through intervening I/O controllers (not shown).

Memory 412 can also include various forms of data 500 pertaining to WCS 300, compressor 302 and/or pump 318, and/or components thereof. As discussed elsewhere herein, controller 210 may, for example, adjust a flow rate of water flow 313 entering WCS 300 (e.g., by adjusting a position of control valve 316) based on an identified set of models and/or equations for target water flow rate to improve power output and reduce maintenance costs of a GT system. To calculate the target water flow rate, analysis program 420 of evaluation system 406 can store and interact with data 500 in processes of the present disclosure. For example, operating fluid conditions field 502 can include one or more conditions of air 306, water flow 313, etc. at corresponding times. More specifically, each entry of operating fluid conditions field 502 can include a single group of operating fluid conditions measured (e.g., with sensor(s) 360, 362, 364, 366, 368, 370, 372, 374, 376, 378, 380) during the operation of WCS 300 at a particular point in time, such as temperatures, pressures, etc., of operating fluid (e.g., air 306). Other conditions can be stored elsewhere within data 500 using other fields and/or groups of fields. A set of models for calculating operating fluid conditions and/or GT performance parameters and/or WCS operating parameters and/or WCS component conditions can be stored in fields of data 500. For example, data 500 may include a WCS operating parameter model field 504 which includes one or more models for relating one or more operating fluid conditions to a WCS operating parameter. For example, WCS operating parameter model field 504 may include the following model for a WCS nozzle erosion parameter:

$$K_1 = \frac{K_0}{\int \left(1 + w_1\left(\frac{1}{\sigma}\right) + w_2\left(\frac{1}{\sigma}\right)^2 + w_3(\Delta P_f)\right) dt}$$

wherein $K_1$ is an erosion parameter of a nozzle of WCS 300; $K_0$ is a constant; $w_1$, $w_2$, and $w_3$ are model weights to be updated dynamically based on the GT system; σ (Siemens per meter (S/m)) is an electric conductivity of water entering WCS 300 measured, for example, by sensor 370; and $\Delta P_f$ (pascals (Pa)) is a pressure across filter 308 of WCS 300 measured, for example, by sensors 364, 368.

Data 500 may also include, for example, an operating fluid conditions model field 506 which includes one or more models for relating one or more operating fluid conditions to another operating fluid condition. For example, operating fluid conditions model field 506 may include the following model for water droplet size:

$$DV90 = w_7 + w_{10}\left(\left(w_8\left(\frac{1}{P_n}\right)\right) + w_9\left(\frac{1}{P_n}\right)^2\right) * \frac{K_1(t)}{K_1(t-0)}$$

wherein DV90 (micrometers (μm)) is a water droplet size; $w_7$, $w_8$, $w_8$ and $w_{10}$ are model weights to be updated dynamically based on the GT system; $P_n$ (Pa) is the pressure across a nozzle(s) of nozzle grid 310 determined, for example, as an average of pressures measured, for example, by sensors 372, 374, 376; and $K_1$ is an erosion parameter of a nozzle of WCS 300 determined by a model stored, for example, in WCS operating parameter model field 504.

Data 500 may include, for example, a GT system performance parameter model field 508 which includes one or more models for relating one or more operating fluid conditions to a GT system performance parameter. For example, GT system performance parameter model field 508 may include the following model for a performance parameter of the GT system under ambient conditions:

$$k_2 = w_4(T_{DBE} - T_{WBE}) + w_5(T_{DBE} - T_{WBE})^2 + w_6(T_{WBE}) + w_{12}(DV90)$$

wherein $K_2$ is a performance parameter of a GT system under ambient conditions; $w_4$, $w_5$, $w_6$ and $w_{12}$ are model weights to be updated dynamically based on the GT system; $T_{DBE}$ (degrees Celsius (° C.)) is a dry bulb temperature of air 306 at inlet 304 of WCS 300 measured, for example, by sensor 360, $T_{WBE}$ (° C.) is a wet bulb temperature of air 306 at inlet 304 of WCS 300 measured, for example, by sensor 362, and DV90 (μm) is a water droplet size of water leaving the nozzles of nozzle grid 310 determined by a droplet size model stored, for example, in operating fluid conditions model field 506 as described herein.

Data 500 may include, for example, a WCS component condition model field 510 which includes one or more models for relating one or more operating fluid conditions to a WCS component condition. For example, WCS component condition model field 510 may include the following model for a nozzle replacement time:

$$\frac{|K_1(t) - K_1(t=0)|}{K_1(t-0)} * 100 \geq 2$$

wherein $K_1$ is an erosion parameter of a nozzle of WCS 300 determined by an erosion parameter model stored, for example, in WCS operating parameter model field 504; and the nozzle replacement time is t (hours (hrs)) when the logic of the model is true.

Data 500 may include, for example, a target operating fluid condition equation field 512 which includes one or more equations for relating one or more operating fluid conditions to a target operating fluid condition. For example, target operating fluid condition equation field 512 may include the following equation for target water flow rate:

$$\Delta P_{GT} = K_2 \left(\frac{Q}{W_2}\right)$$

wherein $\Delta P_{GT}$ (Pa) is a power output of a GT system; $K_2$ is a performance parameter of a GT system under ambient conditions determined using a model for GT system performance parameter under ambient conditions stored, for example, in GT system performance parameter model field 508; Q (cubic meters per second (m³/s)) is a target water flow rate of water flow 313 entering WCS 300, for example, at connection 330; and $W_2$ (m³/s) is a flow rate of air 306 at inlet 304 of WCS 300 measured, for example, by sensor 366.

Controller 210 can thereby adjust a water flow rate to WCS 300 in real-time based on the collected data 500. For example, controller 210 can adjust the position of control valve 316 and/or other components of WCS 300 to change the flow rate of water flow 313 based on the calculated target water flow rate. Controller 210 can adjust control valve 316 and/or other components using control inputs in the form of, e.g., digital commands, instructions, etc., which can be converted into mechanical adjustments of control valve 316 and/or other components. Adjusting control valve 316 can, for example, directly change a flow rate of water flow 313 entering WCS 300, for example, at connection 330, and such changes in flow rate can, for example, indirectly affect other conditions of WCS 300 and/or compressor 302 and/or the GT system. As an example, the adjustment of the flow rate of water flow 313 entering WCS 300 may reduce the degradation and/or erosion of the nozzles (e.g., nozzle 312) of the nozzle grid 310. In another example, adjusting the flow rate of water flow 313 entering WCS 300 may improve the power output of the GT system.

Computing device 404 can comprise any general purpose computing article of manufacture for executing computer program code installed by a user (e.g., a personal computer, server, handheld device, etc.). However, it is understood that computing device 404 is only representative of various possible equivalent computing devices and/or technicians that may perform the various process steps of the disclosure. In addition, computing device 404 can be part of a larger system architecture of controller 210, operable to control various aspects and elements of a machine.

To this extent, in other embodiments, computing device 404 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 404 may include a program product stored on a computer readable storage device, which can be operative to automatically control WCS 300 (e.g., via control valve 316) when executed.

Figure 4:
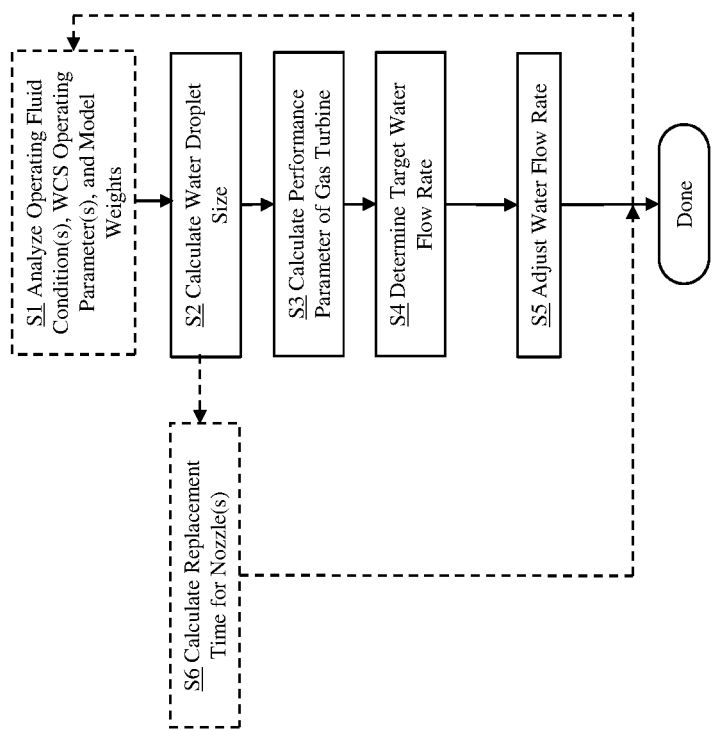
FIG. 4 provides an illustrative flow diagram of a method for controlling a wet compression system, according to embodiments of the present disclosure.
Figure 5:
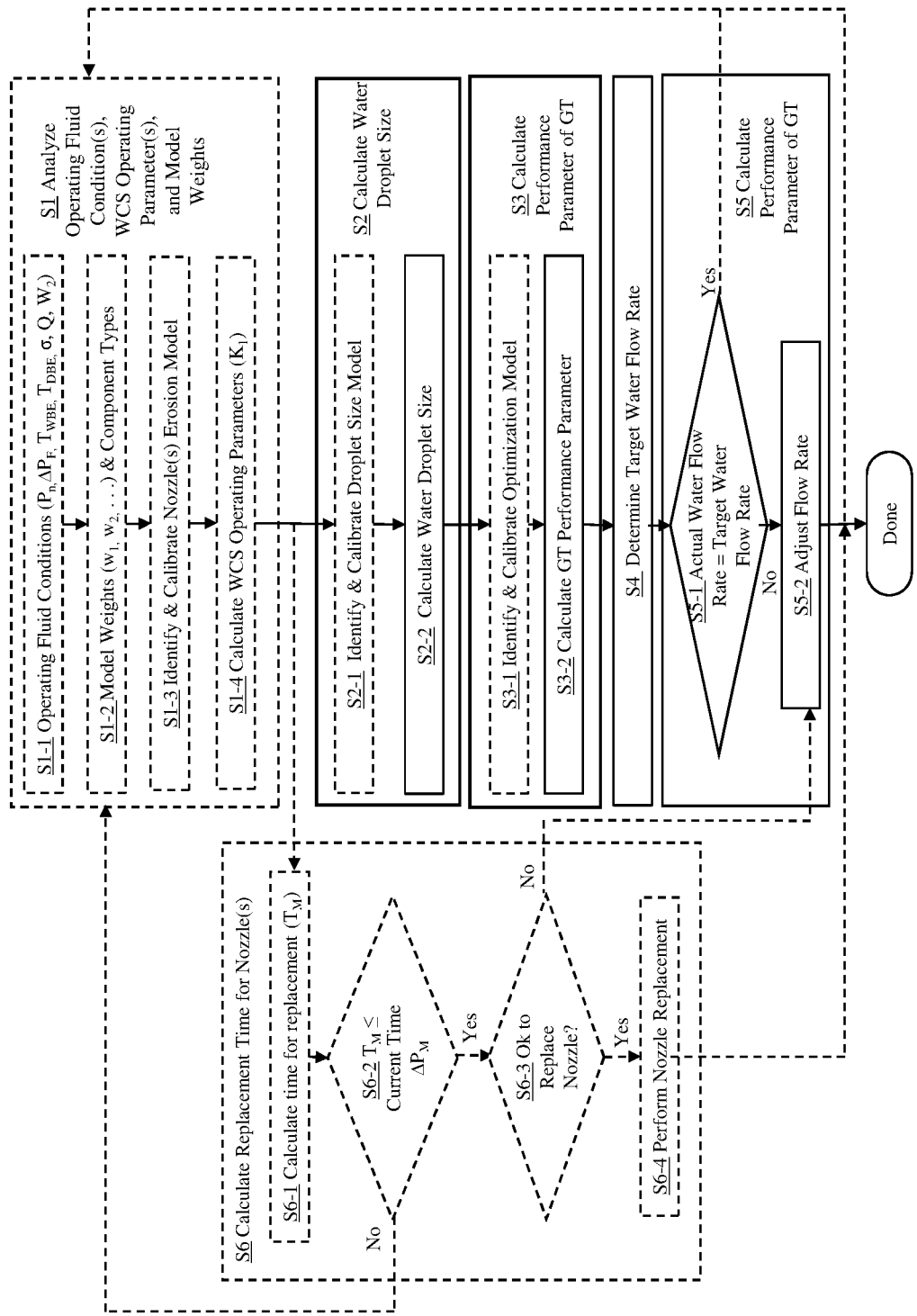
FIG. 5 provides an illustrative flow diagram of a method for controlling a wet compression system, according to further embodiments of the present disclosure.

Referring to FIGS. 2-4 together, steps for controlling a WCS in embodiments of the present disclosure are shown. The steps shown in FIG. 4 and described herein provide a general process overview for implementing embodiments of the present disclosure, and are discussed by reference to a group of illustrative examples. In addition, the process flow illustrated in FIG. 4 can be implemented, e.g., by way of system(s) 200 including controller(s) 210 therein. During the operation of a WCS such as WCS 300, a data analyzer 422 of analysis program 420 of controller 210 may, for example, analyze, receive, identify, calculate and/or otherwise obtain a set of operating fluid conditions and/or WCS operating parameters, and/or WCS component types. Data analyzer 422 of analysis program 420 of controller 210, may also, for example, analyze, receive, identify, calculate and/or otherwise obtain a set of model weights e.g., $w_1$, $w_2$, etc., for models stored in the fields of data 500. The analysis of operating fluid conditions and/or WCS operating parameters and/or WCS component types and/or model weights in step S1 can be performed using sensor(s)—360, 362, 364, 366, 368, 370, 372, 374, 376, 378, 380, and/or interface 390, and/or at least partially with controller 210. Step S1 thereby can be embodied as a separate or preliminary step, and is shown in phantom in FIG. 4 for this reason. In an embodiment, these and other operating fluid conditions and/or operating parameters and/or component types for WCS 300 and/or model weights can be transmitted to controller 210, e.g., through sensor(s) 360, 362, 364, 366, 368, 370, 372, 374, 376, 378, 380 and/or interface 390 and/or other instruments configured to measure, derive, etc., one or more operating fluid conditions and/or operating parameter and/or component type to WCS 300. As discussed herein, the operating fluid conditions analyzed in step S1 may include, e.g., a temperature, pressure, electric conductivity, flow rate, etc., of operating fluids (e.g., air 306 and/or water flow 313), and may be stored, for example, as data 500 in operating fluid condition field 502. As discussed herein, the model weights analyzed in step S1 may include, e.g., $w_1$, $w_2$, etc., and may be stored, for example, in the fields of data 500 based on their respective models. As discussed herein, the WCS operating parameters analyzed in step S1 may include, e.g., erosion parameter $K_1$ and may, for example, be stored and analyzed using models stored in WCS operating parameter model field 504. As discussed herein, the WCS components types may include a nozzle type, and may be stored, for example, as data in the WCS components condition model field 510. More specifically, communicator 424 of analysis program 420 may, for example, identify a WCS operating parameter model stored in WCS operating parameter model field 506, e.g., a nozzle erosion model. Calculator 426 of analysis program 420 may, for example, calculate the nozzle erosion parameter based on at least one operating fluid condition and at least one model weight also analyzed in step S1. Some example implementations, sub-steps, etc., of step S1 are shown in FIG. 5 and discussed in detail elsewhere herein.

After analyzing operating fluid conditions and/or WCS operating parameters and/or model weights in step S1, the flow can proceed to step S2 of calculating a water droplet size of water leaving the nozzles of nozzle grid 310 during the operation of WCS 300. More specifically, communicator 424 of analysis program 420 may, for example, identify an operating fluid condition model stored in operating fluid condition model field 506, for calculating a water droplet size. The operating fluid condition model may, for example, be selected based on the type of nozzles in wet compression nozzle grid 310 which may, for example, be analyzed in step S1 by sensor(s) 360, 362, 364, 366, 368, 370, 372, 374, 376, 378, 380 and/or interface 390 and/or controller 210. Calculator 426 of analysis program 420 may, for example, calculate the water droplet size of the water leaving the nozzle(s) of nozzle grid 310, based on at least one operating fluid condition, a WCS operating parameter analyzed in step S1, and at least one model weight analyzed in step S1. Some example implementations, sub-steps, etc., of step S2 are shown in FIG. 5 and discussed in detail elsewhere herein.

After calculating the water droplet size in step S2, the flow can proceed to step S3 of calculating a performance parameter of the GT system. More specifically, calculator 426 of analysis program 420 may, for example, calculate GT system performance parameter $K_2$, using a GT system performance parameter model, stored in GT system performance parameter model field 508. The GT system performance parameter may, for example, be calculated based on at least one condition of an operating fluid analyzed in step S1, the water droplet size calculated in step S2, and at least one model weight analyzed in step S1. Some example implementations, sub-steps, etc., of step 3 are shown in FIG. 5 and discussed in detail elsewhere herein.

After calculating GT system performance parameter in step S3, the flow can proceed to step S4 of determining a target water flow rate for water flow 313 entering WCS 300, for example, at connection 330 to nozzle grid 310. For example, comparator 428 may compare a power output value at various water flow rates calculated by calculator 426 using an operating fluid condition equation. For example, the operating fluid condition equation may include a power augmentation model, stored in target operating fluid condition equation field 512, based on a GT system performance parameter calculated in step S3, and at least one operating fluid parameter analyzed in step S1. For example, calculator 426 and comparator 428 may perform iterations of calculating a power augmentation value at various water flow rates and comparing the power augmentation values calculated until a standard deviation of +/−1 standard deviation is reached. In another example, calculator 426 and comparator 428 may perform iterations of calculating a power augmentation value at a water flow rate and comparing the power augmentation values calculated until the power augmentation value stops increasing and/or decreasing. Although example implementations, sub-steps, etc., of step S4 are not shown in FIG. 5 and discussed in detail elsewhere herein, step S4 may include any desirable implementation, number of sub-steps etc.

After determining a target water flow rate in step S4, the flow can proceed to step S5 of adjusting the water flow rate of water entering WCS 300, e.g., water flow 313 at connection 330, based on the target water flow rate determined in step S3. For example, comparator 428 may, for example compare the target water flow rate to the actual water flow rate of water flow 313, e.g., measured by sensor 380. Based on comparator 428, determinator 430 may, for example, determine whether communicator 424 should direct controller 210 to adjust the water flow rate of water flow 313. Based on determinator 430, communicator 424 may, for example, direct controller 210 to automatically adjust a position of a control valve 316 of WCS 300 and/or other aspects of WCS 300 which may directly and/or indirectly affect the water flow rate of water flow 313. The action(s) implemented by controller 210 in step S5 can vary based on the operation of WCS 300. Once step S5 is complete, the process may for example, flow to "Done." Additionally, the process may, for example, flow back to step S1 and repeat the process to controller 120 adjust the flow rate of water flow 313 to a target water flow rate to improve GT system power output and reduce maintenance costs. Some example implementations, sub-steps, etc., of step S5 are shown in FIG. 5 and discussed in detail elsewhere herein.

In addition to calculating a target water flow rate for water flow 313 in real-time during operation, embodiments of the present disclosure also provide optional nozzle replacement time calculations for the nozzles of nozzle grid 310, e.g., step S6 (in phantom). More specifically, calculator 426 of analysis program 420 may, for example, calculate a replacement time for the nozzles (e.g., nozzle 312) of nozzle grid 310 using a nozzle replacement model, stored in WCS component condition model field 510, based on a WCS operating parameter analyzed in step S1. The nozzle replacement time may be calculated for as few as one nozzle, e.g., nozzle 312, to as many as all nozzles of nozzle grid 310. Some example implementations, sub-steps, etc., of step 3 are shown in FIG. 5 and discussed in detail elsewhere herein.

Referring to FIGS. 2, 3, and 5 together, processes and sub-processes for controlling the operation of water bath heater 300 are discussed. Step S1 can be implemented in controller 210 including substeps S1-1, S1-2, S1-3 and S1-4. For example, data analyzer 422 may receive operating fluid conditions and/or calculate WCS operating parameters and/ or receive model weights and/or WCS component types including but not limited to: at substep S1-1 receiving a water pressure at nozzle(s), e.g., nozzle(s) 312, of nozzle grid 310 (e.g., at sensors 372, 374, 376), air 306 pressure across filter 308 (e.g., sensor 364 upstream of filter 308 and sensor 368 downstream of filter 308), a wet bulb temperature of air (e.g., sensor 360 at inlet 304 of WCS 300), a dry bulb temperature of air 306 (e.g., sensor 362 at inlet 304 of WCS 300), an electric conductivity of water flow 313 (e.g. sensor 370 at connection 330), a flow rate of water flow 313 (e.g., sensor 380 at connection 330), and a flow rate of air 306 (e.g., sensor 366 at inlet 304 of WCS 300); at substep S1-2 receiving the model weights (e.g., at interface 390) and component types (e.g., type of nozzle 312), at substep S1-3 data analyzer 422 may identify a nozzle erosion model from WCS operating parameter model field 504, and calibrate the model using model weights received in substep S1-2, and in sub-step S1-4, data analyzer 422 may calculate a WCS nozzle erosion parameter based on the electric conductivity of water flow 313 and water pressure across filter 308 received in substep S1-1.

FIG. 5 also shows an illustrative example of step S2 including substeps S2-1 and S2-2. For example, at substep S2-1, data analyzer 422 may identify a droplet size model from operating fluid condition model field 506, for example, based on the type of nozzle(s) (e.g., nozzle 312) in nozzle grid 310 analyzed in step S1. Also in substep S2-1, data analyzer 422 may calibrate droplet size model based on model weights received in substep S1-2. In substep S2-2, for example, calculator 426 may calculate the droplet size of water flow 313 leaving nozzle(s), e.g., nozzle 312, of the nozzle grid 310, based on water pressure at the nozzle(s) received in substep S1-1 and the WCS nozzle erosion parameter calculated in substep S1-4.

FIG. 5 also shows an illustrative example of step S3 including substeps S3-1 and S3-2. For example, at substep S3-1, data analyzer 422 may identify a GT system performance parameter model from GT system performance parameter model field 508 and calibrate the GT system performance parameter model based on model weights received in substep S1-2. In substep S3-2, for example, calculator 426 may calculate the GT performance parameter. The GT performance parameter may be based on the dry bulb temperature and wet bulb temperature of air 306 received in substep S1-1. The GT performance parameter may also be based on the water droplet size of water flow 313 leaving the nozzle(s) of WCS 300, as calculated in substep S2-2.

As shown in the illustrative example of FIG. 5, step S4 can be implemented in controller 210 substantially in accordance with the overview process flow in FIG. 4 and/or the example embodiments discussed elsewhere herein. For example, in step S4, data analyzer 422 may identify a target water flow rate equation from target operating fluid condition equation field 512. Comparator 428 and calculator 426 may determine a target water flow rate for water flow 313 entering WCS 300, e.g., at connection 330 to nozzle grid 310. The target water flow rate may be, for example, based on the GT system performance parameter calculated in substep S3-2. The target water flow rate may also be based on, for example, the flow rate of air 306 received in substep S1-1.

FIG. 5 also shows an illustrative example of step S5 including substeps S5-1 and S5-2. For example, in substep S5-1, comparator 428 may compare the target water flow rate calculated in step S4 to an actual water flow rate of water flow 313 received in substep S1-1. Determinator 430 may, for example, determine whether communicator 424 should direct controller 210 to adjust the water flow rate of water flow 313 entering WCS 300, e.g., at connection 330 to nozzle grid 310. In a first instance, for example, where the target water flow rate is equal to the actual water flow rate, the illustrative process may return to step S1. In a second instance, for example, where the target water flow rate is not equal to the actual water flow rate, the illustrative process may flow to substep S5-2. At substep S5-2 communicator 424 may, for example, direct controller 210 to automatically adjust the flow rate of water flow 313 entering WCS 300. For example, controller 210 may adjust the positions of control valve 316. After substep S5-2 concludes, the process may for example, flow to "Done." Additionally, once substep S5-2 is complete, the process may also, for example, as shown in phantom, flow back to step S1 to monitor and adjust the flow rate of water flow 313 entering WCS 300.

FIG. 5 also shows an illustrative example of optional step S6 including substeps S6-1, S6-2, S6-3 and S6-4. For example, in substep S6-1, calculator 426 may calculate a time to replace the nozzle(s) (e.g., nozzle 312) of nozzle grid 310 using a nozzle replacement time model. The nozzle replacement time model may be stored, for example, in WCS component condition model field 510. The nozzle replacement time may be, for example, based on the WCS operating parameter calculated in substep S1-4. In substep S6-2, for example, comparator 428 may, for example, compare the calculated nozzle replacement time and the current time. Determinator 430 may, for example, based on comparator 428, determine whether to move to substep S6-3. In a first instance, for example, where the calculated nozzle replacement time of substep S6-1 is greater than the actual time, the illustrated process may return to step S1. In a second instance, for example, where the calculated nozzle replacement time of substep S6-1 is less than or equal to the actual time, the illustrated process may proceed to substep S6-3. In substep S6-3, for example, determinator 430 may, for example, determine whether to replace the nozzle(s) of the nozzle grid 310. In a first instance when the nozzle replacement cannot be performed, the illustrative process may flow to substep S5-2. In substep S5-2, the controller 210 may, for example, adjust the flow rate of water flow 313, to reduce the wear on the nozzle(s) of nozzle grid 310. An example of an instance where replacement cannot be performed may include, for example, when the WCS cannot be shut down. In a second instance, for example, where the nozzle(s) can be replaced, the process may proceed to substep S6-4. In substep S4-2, communicator 424 may, for example, direct controller 210 to notify personnel to replace the nozzle(s) of the wet compression nozzle grid. Once substep S6-4 is complete, the process may, for example, flow to "Done." Additionally, once substep S6-4 is complete, the process may also, for example, shown in phantom, flow back to step S1. At step S6, controller 120, may for example monitor and replace the nozzle(s) of nozzle grid 310 to reduce maintenance costs and improve GT system power output.

Although FIG. 5 includes several sub-processes for steps S1, S2, S3, S5 and S6, it is understood that alternative embodiments may include executing steps S1 and/or S2 and/or S3 and/or S5 and/or S6 in the simplified form illustrated in FIG. 4, and/or omitting and/or rearranging the various optional sub-processes for steps S1 and/or S2 and/or S3 and/or S5 and/or S6 shown in FIG. 5 and described herein.

It is also understood that one or more of the comparisons in steps S5-1, S6-2 and step S6-3 can be omitted or arranged in a different order, such that analysis program 420 can adjust operating parameters based on selected quantities and/or in a particular order of preference.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wet compression system (WCS) for a gas turbine (GT) system, the method comprising:
   calculating a water droplet size at a nozzle of a nozzle grid of the WCS based on at least one condition from a set of WCS operating fluid conditions;
   calculating at least one GT system performance parameter based on the water droplet size and at least one distinct condition from the set of WCS operating fluid conditions;
   determining a target water flow rate based on the at least one GT system performance parameter and another distinct condition from the set of WCS operating fluid conditions; and
   adjusting a flow rate of a water flow to the nozzle based on the target water flow rate.

2. The method of claim 1, wherein the calculating the water droplet size is based on a nozzle erosion model for relating a pressure across a filter upstream of the nozzle, a conductivity of the water flow to the nozzle, and the water droplet size.

3. The method of claim 2, further comprising calibrating the nozzle erosion model based on a GT system parameter weight before the calculating the water droplet size at the nozzle.

4. The method of claim 1, wherein the calculating the water droplet size at the nozzle is based on a droplet size model for relating a pressure of the nozzle, a conductivity of the water flow to the nozzle, a pressure across a filter upstream of the nozzle, and the water droplet size.

5. The method of claim 4, further comprising calibrating the droplet size model based on a GT system parameter weight before the calculating the water droplet size at the nozzle.

6. The method of claim 1, wherein the calculating the at least one GT system performance parameter is based on a performance optimization model for relating the water droplet size, the at least one air temperature within the WCS, and the at least one GT system performance parameter.

7. The method of claim 6, further comprising calibrating the performance optimization model based on a GT system parameter weight before the calculating the at least one GT system performance parameter.

8. The method of claim 1, wherein the at least one distinct condition includes a dry bulb air temperature at an entrance to the WCS.

9. The method of claim 1, wherein the at least one distinct condition includes a wet bulb air temperature at an entrance to the WCS.

10. The method of claim 1, wherein the at least one condition includes an electric conductivity of the water flow to the nozzle of the WCS.

11. The method of claim 1, wherein the at least one condition includes a pressure across the nozzle.

12. The method of claim 1, wherein the at least one condition includes a pressure drop across a filter upstream of the nozzle.

13. The method of claim 1, wherein the adjusting the flow rate of the water flow to the nozzle includes adjusting a position of a valve which controls the flow rate of the water flow.

14. The method of claim 1, further comprising calculating a past or a future nozzle replacement time for the nozzle based on the at least one condition.

15. The method of claim 14, wherein the calculating the past or the future nozzle replacement time for the nozzle is based on a nozzle erosion model for relating a pressure across a filter upstream of the nozzle, a conductivity of the water flow to the nozzle and the past or the future nozzle replacement time.

16. The method of claim 15, further comprising calibrating the nozzle erosion model based on a WCS parameter before the calculating the past or the future nozzle replacement time for the nozzle.

17. A system for operating a wet compression system (WCS) for a gas turbine (GT) system, the system comprising:
   a controller in communication with the WCS, the controller being operable to:
      calculate a water droplet size at a nozzle of a nozzle grid of the WCS based on at least one condition from a set of WCS fluid operating conditions;
      calculate at least one GT system performance parameter based on the water droplet size and at least one distinct condition from the set of WCS operating fluid conditions;
      determine a target water flow rate based on the at least one GT system performance parameter and another distinct condition from the set of WCS operating fluid conditions; and
      adjust a flow rate of a water flow to the nozzle based on the target water flow rate.

18. The system controller of claim 17, further operable to a past or a future nozzle replacement time for the nozzle based on the at least one condition.

19. A program product stored on a non-transitory computer readable storage medium for operating a wet compression system (WCS) in a gas turbine (GT) system, the non-transitory computer readable storage medium comprising program code for causing a computer system to:

calculate a water droplet size at a nozzle of a nozzle grid of the WCS based on at least one condition from a set of WCS operating fluid conditions;

calculate at least one GT system performance parameter based on the water droplet size and at least one distinct condition from the set of WCS operating fluid conditions;

determine a target water flow rate based on the at least one GT system performance parameter and another distinct WCS operating fluid condition from the set of WCS operating fluid conditions;

and adjust a water flow rate to the nozzle based on the target water flow rate.

20. The non-transitory computer readable storage medium of claim 19, further comprising program code for causing the computer system to calculate a past or a future nozzle replacement time for the nozzle based on the at least one condition.

* * * * *